(12) United States Patent
Al-Kadi et al.

(10) Patent No.: US 10,050,964 B2
(45) Date of Patent: Aug. 14, 2018

(54) METHOD AND SYSTEM FOR SECURING DATA COMMUNICATED IN A NETWORK

(71) Applicant: NXP B.V., Eindhoven (NL)

(72) Inventors: Ghiath Al-Kadi, Graz (AT); Jurgen Geerlings, Eindhoven (NL); Piotr Polak, Eindhoven (NL); Jan-Willem Vogel, Eindhoven (NL)

(73) Assignee: NXP B.V., Eindhoven (NL)

( * ) Notice: Subject to any disclaimer, the term of this patent is extended or adjusted under 35 U.S.C. 154(b) by 148 days.

(21) Appl. No.: 15/093,904

(22) Filed: Apr. 8, 2016

(65) Prior Publication Data
US 2016/0315937 A1   Oct. 27, 2016

(30) Foreign Application Priority Data
Apr. 23, 2015   (EP) .................................... 15164793

(51) Int. Cl.
| H04L 29/06 | (2006.01) |
| H04W 12/02 | (2009.01) |
| H04L 9/08 | (2006.01) |

(52) U.S. Cl.
CPC ........ *H04L 63/0876* (2013.01); *H04L 9/0861* (2013.01); *H04L 63/0435* (2013.01); *H04L 63/061* (2013.01); *H04L 63/0853* (2013.01); *H04W 12/02* (2013.01); *H04L 2463/061* (2013.01)

(58) Field of Classification Search
CPC ............... H04L 63/0876; H04L 9/0861; H04L 63/0435; H04L 63/061; H04L 63/0853; H04W 12/02
USPC ........................................................ 713/153
See application file for complete search history.

(56) References Cited

U.S. PATENT DOCUMENTS

| 5,960,086 A | * | 9/1999 | Atalla | ................... H04L 9/0891 |
| | | | | 380/260 |
| 8,898,767 B1 | * | 11/2014 | Chen | ..................... H04L 9/0861 |
| | | | | 713/189 |
| 2004/0008846 A1 | * | 1/2004 | Medvinsky | ............. H04L 9/083 |
| | | | | 380/278 |

(Continued)

FOREIGN PATENT DOCUMENTS

WO      WO-98/47259      10/1998

OTHER PUBLICATIONS

"Digital Living Network Alliance"; retrieved from the internet http://www/dlna.org/ on Apr. 6, 2016 (2 pages).

(Continued)

*Primary Examiner* — Michael S McNally

(57) ABSTRACT

According to a first aspect of the present disclosure, a method is conceived for securing data communicated in a network, the method comprising: receiving, by a destination node in the network, at least one message transmitted by a source node in the network; generating, by said destination node, a session key by executing a one-way function that takes at least a part of a last received message and an initial key as input parameters; using, by said destination node, the session key for encrypting or decrypting said data. Furthermore, according to a second aspect of the present disclosure, a corresponding computer program product is conceived. Furthermore, according to a third aspect of the present disclosure, a corresponding system is conceived.

16 Claims, 6 Drawing Sheets

(56) References Cited

U.S. PATENT DOCUMENTS

| | | | |
|---|---|---|---|
| 2006/0129811 A1* | 6/2006 | Fiske | H04L 9/0631 |
| | | | 713/167 |
| 2008/0112561 A1* | 5/2008 | Kim | H04L 9/0643 |
| | | | 380/42 |
| 2008/0313462 A1 | 12/2008 | Zhao et al. | |
| 2013/0076491 A1 | 3/2013 | Brandsma et al. | |
| 2013/0141223 A1 | 6/2013 | Brandsma et al. | |
| 2013/0198813 A1 | 8/2013 | van Roermund et al. | |
| 2013/0211761 A1 | 8/2013 | Brandsma et al. | |
| 2013/0219172 A1* | 8/2013 | Johnson | H04L 63/0272 |
| | | | 713/153 |
| 2013/0271268 A1 | 10/2013 | Brandsma et al. | |
| 2013/0312072 A1 | 11/2013 | van Roermund et al. | |
| 2014/0068089 A1 | 3/2014 | Brandsma et al. | |

OTHER PUBLICATIONS

"Open Connectivity Foundation"; retrieved from the internet http://openconnectivity.org/ on Apr. 6, 2016; 6 pages.

"ZigBee Alliance"; retrieved from the internet http://www.zigbee.org on Apr. 6, 2016; 2 pages.

Extended European Search Report for Application 15164793.0 (dated Oct. 29, 2015).

* cited by examiner

METHOD AND SYSTEM FOR SECURING DATA COMMUNICATED IN A NETWORK

CROSS-REFERENCE TO RELATED APPLICATIONS

This application claims the priority under 35 U.S.C. § 119 of European patent application no. 15164793.0, filed Apr. 23, 2015 the contents of which are incorporated by reference herein.

FIELD

The present disclosure relates to a method for securing data communicated in a network. Furthermore, the present disclosure relates to a corresponding computer program product and to a corresponding system for securing data communicated in a network.

BACKGROUND

Today, electronic devices are often networkable devices, That is to say, such devices may often be incorporated into wired networks, such as Ethernet, or wireless networks, for example cellular networks, ZigBee networks, Bluetooth networks and Wi-Fi networks. Another example of a network of devices is an in-vehicle network. Networkable devices may transmit a large amount of data to each other over wired or wireless communication channels. In order to protect the transmitted data, the data are often encrypted. For example, they may be encrypted by performing a cryptographic algorithm which takes a cryptographic key and said data as inputs, or, in other words, the data may be encrypted with the cryptographic key. An example of such a cryptographic algorithm is the so-called Advanced Encryption Standard (AES) algorithm. In case of symmetric-key cryptographic algorithms, the cryptographic key is a secret key which is shared between a source node and a destination node involved in a data transmission, and which should preferably have a limited lifetime. Therefore, so-called session keys are often generated. Session keys can only be used during a specific session of short duration, in order to prevent replay attacks.

SUMMARY

According to a first aspect of the present disclosure, a method is conceived for securing data communicated in a network, the method comprising: receiving, by a destination node in the network, at least one message transmitted by a source node in the network; generating, by said destination node, a session key by executing a one-way function that takes at least a part of a last received message and an initial key as input parameters; using, by said destination node, the session key for encrypting or decrypting said data.

In one or more embodiments, said part of the last received message is a message authentication code.

In one or more embodiments, the one-way function is an encryption function. In one or more embodiments, the session key is also generated by the source node, and the session key is used, by the source node and the destination node, to encrypt and decrypt data communicated between them.

In one or more embodiments, the source node is a network gateway. In one or more embodiments, the initial key is a secret master key.

In one or more embodiments, the data are encrypted or decrypted by executing said one-way function.

In one or more embodiments, generating the session key comprises performing a key extraction process after executing the one-way function.

In one or more embodiments, the method further comprises: generating, by the destination node; a new session key by executing the one-way function, wherein the one-way function takes said part of the last received message and the session key as input parameters; using, by the destination node; the new session key for encrypting or decrypting said data.

In one or more embodiments, the new session key is also generated by the source node, and the new session key is used, by the source node and the destination node, to encrypt and decrypt data communicated between them.

According to a second aspect of the present disclosure, a computer program product is provided, which comprises executable instructions which, when being executed by a processing unit, cause said processing unit to carry out or control a method as claimed in any preceding claim.

According to a third aspect of the present disclosure, a system is conceived for securing data communicated in a network, the system comprising: a destination node in the network, said destination node being arranged to receive messages from a source node in the network; said destination node further being arranged to generate a session key by executing a one-way function that takes at least a part of a last received message and an initial key as input parameters; said destination node further being arranged to use the session key for encrypting or decrypting said data.

In one or more embodiments, the source node is also arranged to generate the session key, and the source node and the destination node are arranged to encrypt and decrypt data communicated between them using the session key.

In one or more embodiments, the destination node is further arranged to generate a new session key by executing the one-way function, wherein the one-way function takes said part of the last received message and the session key as input parameters; and the destination node is further arranged to use the new session key for encrypting or decrypting said data.

In one or more embodiments, the source node is also arranged to generate the new session key, and the source node and the destination node are arranged to encrypt and decrypt data communicated between them using the new session key.

DESCRIPTION OF DRAWINGS

Embodiments be described in more detail with reference to the appended drawings, in which.

DESCRIPTION OF EMBODIMENTS

As mentioned above, according to a first aspect of the present disclosure, a method is conceived for securing data communicated in a network. The method comprises the following steps. A destination node in the network receives at least one message transmitted by a source node in the network. Furthermore, the destination node generates a session key by executing a one-way function that takes at least a part of a last received message and an initial key as input parameters. Subsequently, the destination node uses this session key for encrypting or decrypting data. For instance, the destination node may encrypt data to be communicated back to the source node with the generated session key. Thereby, relatively complex procedures for generating session keys which are based on, for example, pseudo-random number generators may be avoided. This may be useful in many kinds of networks, such as Ethernet, ZigBee networks, Bluetooth Wi-Fi, and in-vehicle networks. Depending on the performance of the networkable devices; it may be relatively difficult to generate session keys. The presently disclosed method and system may simplify the generation of session keys.

It is noted that, in the below-described illustrative embodiments; the part of the last received message which is taken as input parameter by the one-way function is a message authentication code. Using a message authentication code as input parameter may enable a relatively simple, yet secure, implementation. Alternatively, but without limitation, another part of the last received message may be used as input parameter. For example, a portion of the encrypted data comprised in said message may be used. Furthermore, it may be envisaged that an end-user selects which part of the last received message is used as input parameter. For instance, the end-user may select one of the following options: use the message authentication code as input parameter; use the first 128 bits from the last received message as input parameter; use the last 128 bits from the last received message as input parameter; use the even or odd bytes of the last received message as input parameter; use the first 64 bits and the last 64 bits from the last received message as input parameter. The user may select these options via a user interface of the network gateway and during an initialization phase the network gateway may communicate the selected option to all nodes. Furthermore, the option may be changed periodically and automatically by the system.

Furthermore, it is noted that, in the below-described embodiments, the one-way function is an encryption function, in particular an encryption function which is based on an AES algorithm. The skilled person will appreciate that, in order to implement the presently disclosed method, other one-way functions may be applied as well, for example encryption functions which are based on other known algorithms.

Figure 1:
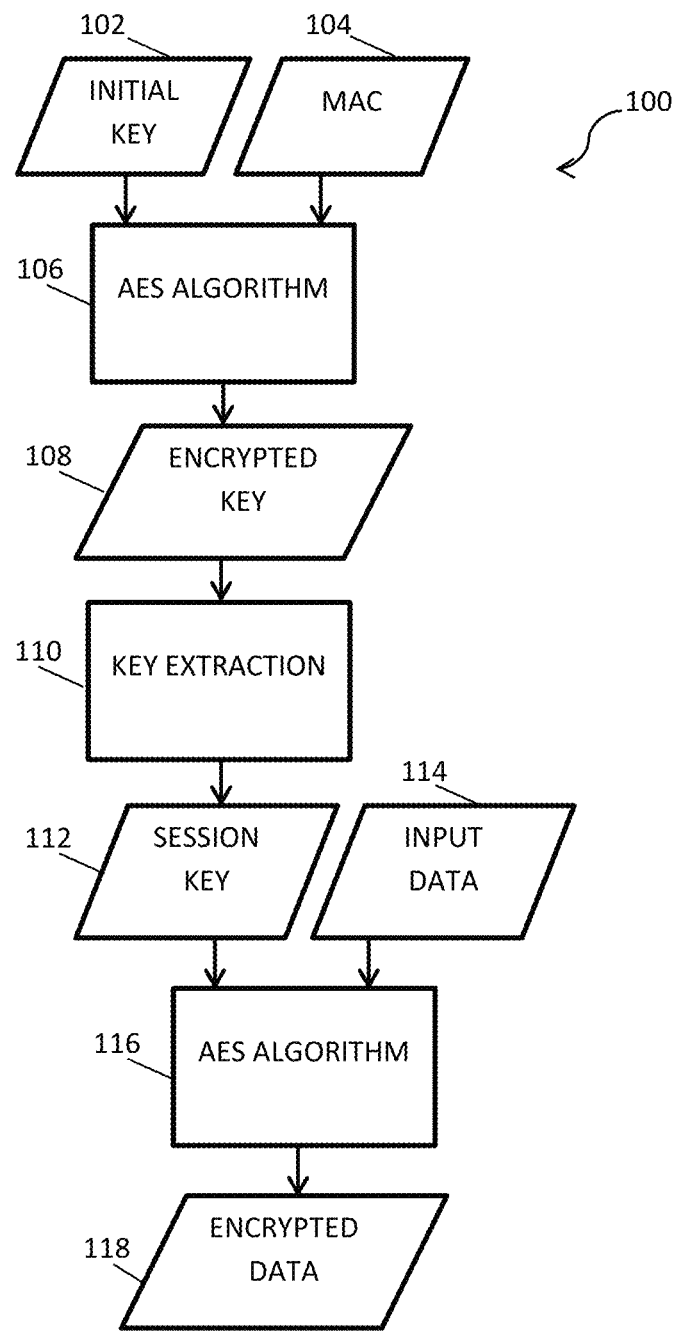
FIG. 1 shows an illustrative embodiment of a method for securing communicated data.

FIG. 1 shows an illustrative embodiment of a method 100 for securing communicated data. The method comprises, at 106; encrypting 106 a message authentication code 104 with an initial key 102. The message authentication code (MAC) 104 is a code which is associated with a message transmitted by a source node in the network. For example, the source node may append the MAC 104 to a payload of a message, and destination nodes may extract the MAC 104 from said message. In this example, said encrypting 106 is realized by performing an AES algorithm 106 which takes the initial key 102 the MAC 104 as inputs. The result of the encryption 106 is an encrypted key 108 which may, if required, be input to a key extraction 110 step, in which a part of the encrypted key (e.g., the first 128 bits) may be extracted, which results in a session key 112. It is noted that the key extraction 110 step may be omitted if the encrypted key 108 has a suitable size (e.g., 128 bits) for use in the cryptographic operations that follow. In this example, input data 114 is encrypted 116 with the generated session key 112. Said encrypting 116 may be realized by performing another AES algorithm 116. AES comprises three algorithm variants or block ciphers, i.e. AES-128, AES-192 and AES-256. Each cipher encrypts and decrypts data in blocks of 128 bits using cryptographic keys having a length of 128-, 192- and 256-bits, respectively. The key extraction function may be configured in accordance with the selected variant.

The two AES algorithms 106 and 116 may be the same, which may result in a particularly efficient implementation. The encryption 116 results in encrypted data 118 which may be transmitted over the network. For instance, a destination node in a network may perform this method 100 in order to generate a session key 112 by means of which it encrypts 116 input data 114, such that it may send encrypted data 118 to a source node from which it had received the MAC 104 used to generate the session key 112. The source node may subsequently decrypt the encrypted data 118 using the same session key 112, which it may have generated by performing a part of this method 100, in particular step 106, and, if required, step 110. Although not shown explicitly in FIG. 1, the destination node may, instead of using the generated session key 112 for encrypting data to be transmitted back to the source node, use said session key 112 for decrypting data received from the source node in a second message, for example. In this case, it is assumed that the source node has generated the same session key and that it has encrypted said data with it; this will be explained with reference to FIG. 5 below, where a so-called network gateway is shown as a specific example of a source node.

Thus, the source node may be a network gateway. For instance, in a ZigBee network, the so-called "coordinator" may be regarded as such a network gateway. The initial key may be a so-called master key. In particular, the initial key may be a secret key which may be shared among network nodes; and which may be distributed to these nodes by the network gateway.

Cryptographic session keys are often generated by means of relatively difficult processes. For example, it may be necessary, in order to generate a session key, to deploy a secure true random generator implemented in, or executed by, a tamper-resistant secure element. Furthermore, session keys which are generated by a central node in the network, such as a network gateway, should be distributed securely to other nodes, which may require relatively complicated security measures. Unfortunately, some network gateways may not be equipped with a secure element; for example. Furthermore, implementing complicated security measures may have a negative impact on the performance of the network. In accordance with the presently disclosed method and system, session keys may be generated in a relatively simple manner. In particular, the initial key (e.g., the master key) is not used to encrypt and decrypt data, but a session key is generated by encrypting a part of a least received message from a source node (e.g., the gateway) with the initial key. Consequently, it may be less important that the initial key is a strong cryptographic key, and that it is distributed securely to other nodes, for example.

In one or more embodiments; as mentioned above, the session key may also be generated by the source node, and the session key may be used, by the source node and the destination node, to encrypt and decrypt data communicated between them. In this way, the session key may change for every transmitted message and thus offers a high level of security.

In one or more embodiments, generating the session key 112 may comprise performing a key extraction process 110 after encrypting 106 the message authentication code 104 with the initial key 102. Performing the key extraction process 110 may be useful if the output of the encryption step 106 is not suitable as input to the encryption step 116, For example, if the encryption step 116 is based on an AES-128 algorithm, the session key 112 should have a size of 128 bits. If the encrypted key 108 is larger than 128 bits, the key extraction process 110 may extract, for example, the first 128 bits from the encrypted key 108. Incidentally, the encrypted key 108 may be smaller than 128 bits; in that case the key extraction process 110 may add padding bits to the encrypted key 108 in order to produce a 128-bit session key 112.

Figure 2:
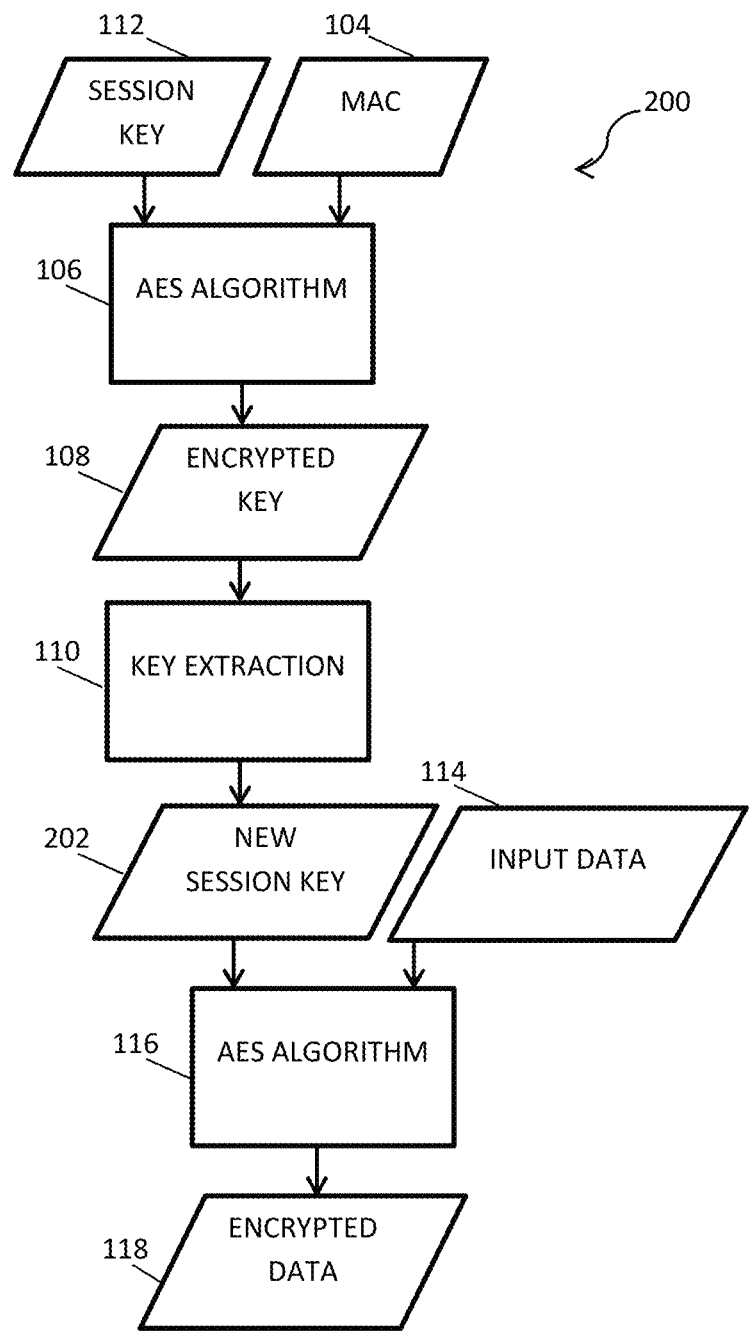
FIG. 2 shows another illustrative embodiment of a method for securing communicated data.

FIG. 2 shows another illustrative embodiment of a method 200 for securing communicated data. As mentioned above, in one or more embodiments, a destination node may generate a new session key by encrypting the message authentication code with the session key, and the destination node may use the new session key for encrypting and decrypting the communicated data. By generating session keys in an iterative process in which the message authentication code of a last received message is encrypted with a current session key, which yields a new session key, the level of security may be increased in a relatively easy manner. FIG. 2 shows a step in such an iterative process. The skilled person will appreciate that the steps shown in FIG. 2 may be repeatable. In particular, each time a session key has been used, a new session key may be generated by performing these steps. In the meantime, the source node may also have sent a message containing a new message authentication code to the destination node. In that case, the new message authentication code is used.

More specifically, the method 200 comprises the same steps as the method 100 shown in FIG. 1. However, in the encryption step 106, the MAC 104 is not encrypted with the initial key 102, but with a current session key. The current session key may for example be the session key 112 that has been generated by encrypting the MAC 104 with the initial key 102 in a first iteration, as shown in FIG. 1. The current session key may also be a session key that has already been generated in dependence of a previous session key. In either case, the MAC 104 may be encrypted 106 with the current session key, which results in an encrypted key 108. In this example, a key extraction process 110 process extracts the new session key 104 from the encrypted key 108. As mentioned above, the key extraction process 110 is an optional process, Subsequently, the input data 114 is encrypted 116 with the new session key 204, which results in encrypted data 118.

Figure 3:
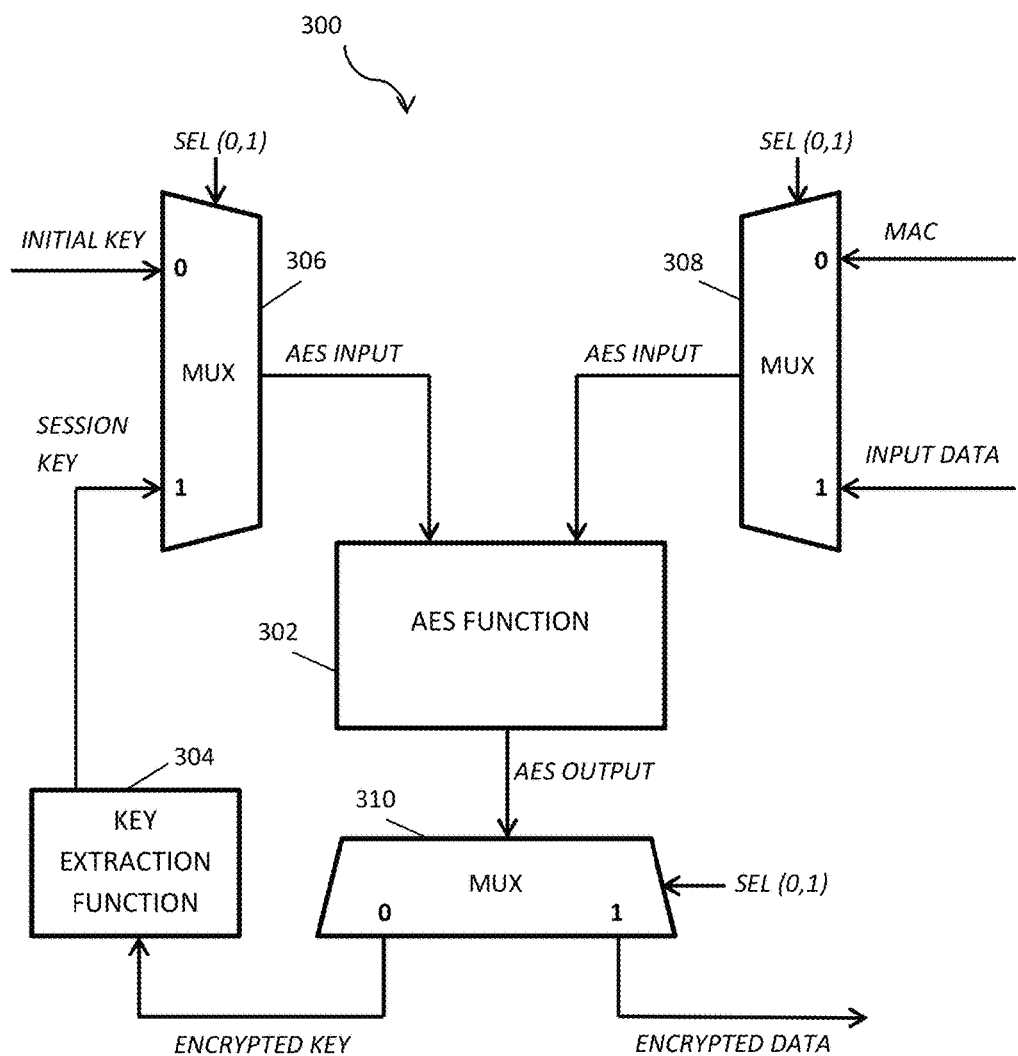
FIG. 3 shows an illustrative implementation of a method for securing communicated data in hardware and, optionally, partially in software.

FIG. 3 shows an illustrative implementation 300 of a method for securing communicated data in hardware and, optionally, partially in software. In particular, an illustrative implementation 300 of the method 100 of FIG. 1 is shown. The implementation 300 may be realized completely in hardware. Optionally, some functions, such as the AES function 302 and the key extraction function 304, may be realized partially or fully in software. The implementation 300 comprises multiplexers 306, 308, 310, which are controlled by a select signal. Depending on the value of the select signal, either the session key generation process (i.e. steps 106 and 110 of FIG. 1) or the data encryption process (i.e. step 116 of FIG. 1) is selected.

Figure 4:
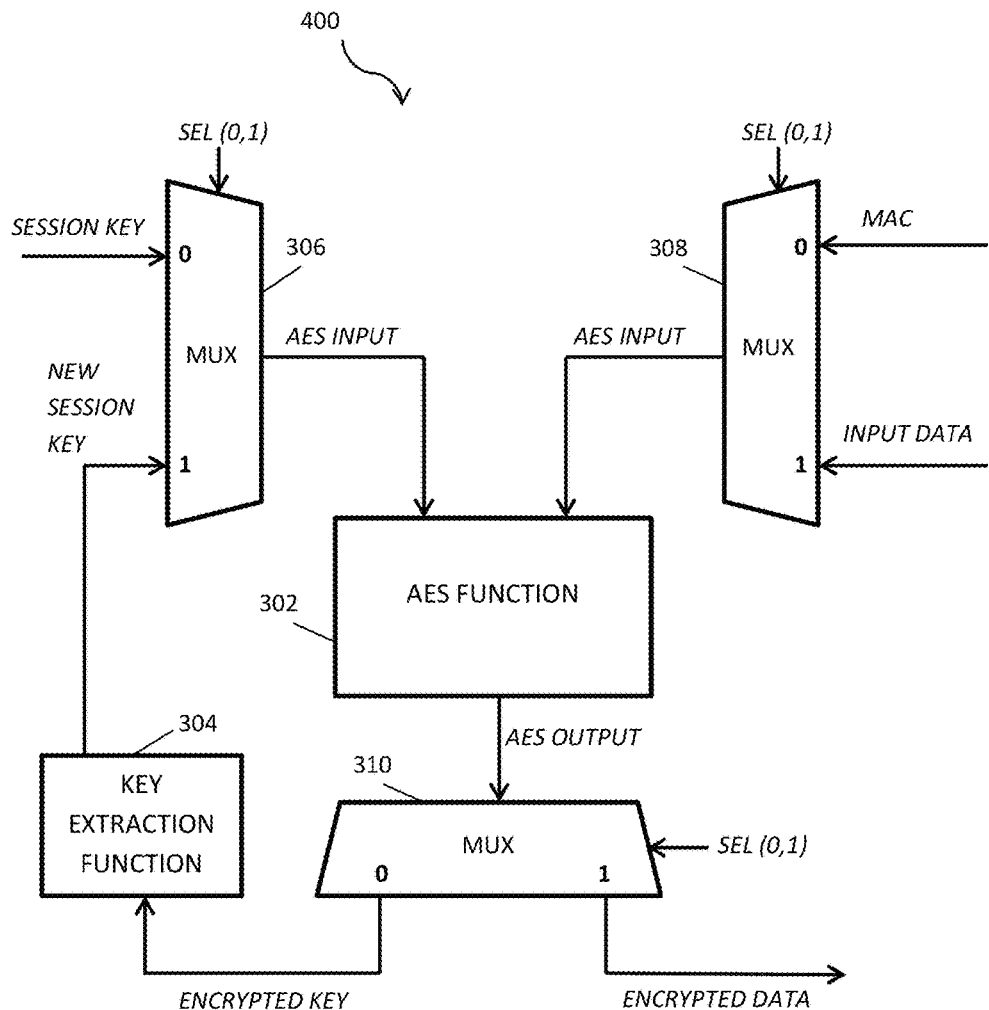
FIG. 4 shows another illustrative implementation of a method for securing communicated data in hardware and, optionally, partially in software.

FIG. 4 shows another illustrative implementation 400 of a method for securing communicated data in hardware and, optionally, partially in software. In particular, an illustrative implementation 400 of the method 200 of MEL 2 is shown. The implementation 400 may be realized completely in hardware. Optionally, some functions, such as the AES function 302 and the key extraction function 304, may be realized partially or fully in software. The implementation 400 comprises multiplexers 306, 308, 310, which are controlled by a select signal. Depending on the value of the select signal, either the new session key generation process (i.e. steps 106 and 110 of FIG. 2) or the data encryption process (i.e. step 116 of FIG. 2) is selected.

Figure 5:
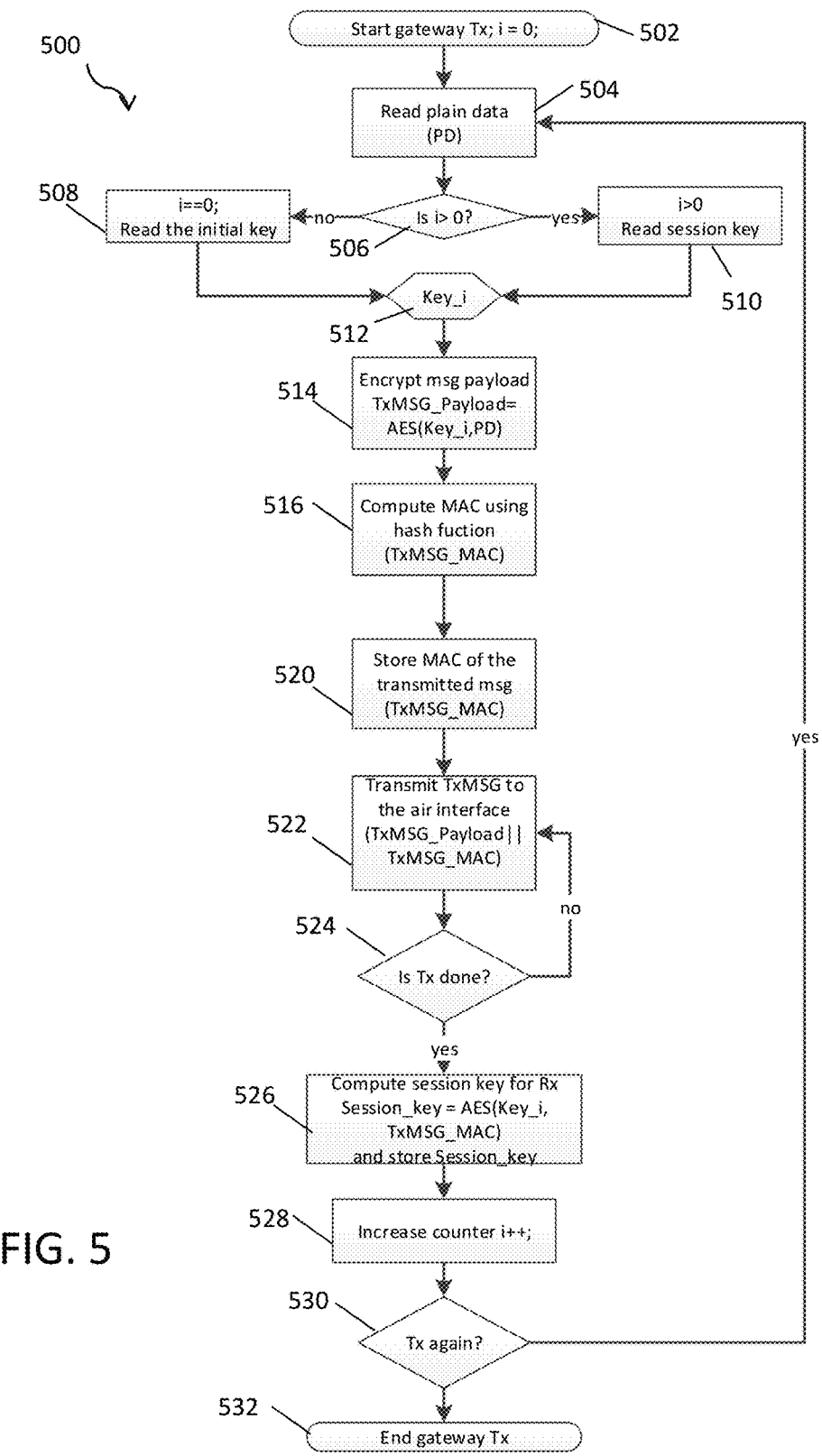
FIG. 5 shows an illustrative embodiment of a gateway message transmission process.

FIG. 5 shows an illustrative embodiment of a gateway message transmission process 500. In particular, it shows how a network gateway may transmit a message, which comprises both encrypted data and a MAC, to a destination node, such that the latter may generate a session key or a new session key, as the case may be in dependence on said MAC, and decrypt encrypted data of the next message using the session key or the new session key. It is noted that, in order to decrypt the encrypted data of the current message, the destination node should still use the initial key or the previously generated session key, as the case may be. In addition, the destination node may encrypt new data, Which is to be communicated back to the gateway, using the generated session key or the generated new session key, in accordance with the method shown in FIG. 1 or FIG. 2. Therefore, the gateway message transmission process 500 includes a step 526 in which the gateway computes the same session key as the destination node is expected to compute, such that, in a gateway message receipt process (shown in detail in FIG. 6) the gateway will be able to decrypt the encrypted new data received from the destination node.

More specifically, the gateway message transmission process 500 comprises the following steps. At 502, the gateway message transmission process starts. At 504, plain data is read, for example, by a processing unit in the gateway, from a memory unit in the gateway. At 506, the processing unit checks if a counter value is greater than zero. At 508, if the counter value is not greater than zero, an initial key is read from the memory unit. At 510, if the counter value is greater than zero, a previously generated session key is read. At 512, the resulting key is made available as an input parameter. At 514, the message payload is encrypted with the resulting key. At 516, a MAC is computed based on the encrypted payload using a hash function, and said MAC is appended to the encrypted message payload, which results in a transmittable message. At 520, the processing unit stores the MAC of the message temporarily, in order to enable computing the session key or new session key in step 526. At 522, the processing unit transmits the message to the air interface. At 524, the processing unit checks if the transmission has finished. If so, the processing unit computes and stores, at 526, the session key for the gateway message receipt process. At 528, the processing unit increases the counter value. At 530, the processing unit checks if more messages should be transmitted. If so, the process 500 returns to step 504. If not, the gateway message transmission process ends at 532.

Figure 6:
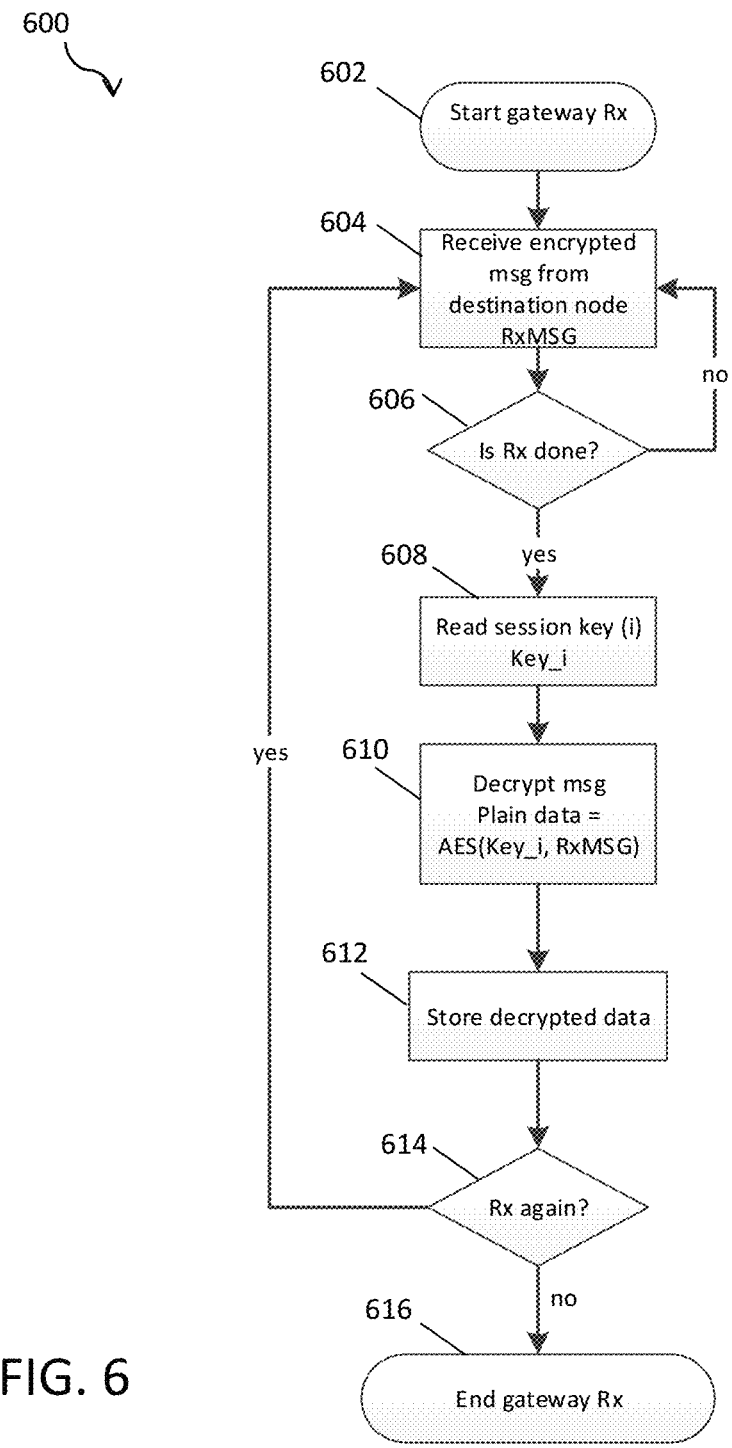
FIG. 6 shows an illustrative embodiment of a gateway message receipt process.

FIG. 6 shows an illustrative embodiment of a gateway message receipt process. In particular, it shows how the network gateway decrypts data, which it has received from the destination node, using the session key or new session key computed in the gateway message transmission process 500. More specifically, the gateway message receipt process starts at 602. At 604, the gateway receives an encrypted message from the destination node. At 606, the processing unit checks if the message receipt has finished. At 608, the processing unit reads the stored session key or new session key, At 610, the processing unit decrypts the message with the session key or new session key. At 612, the processing unit stores the decrypted data. At 614, the processing unit checks if more messages should be received. If so, the process 600 returns to step 604. If not, the gateway message receipt process ends at 616.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (FDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 method for securing communicated data
102 initial key
104 message authentication code
106 AES algorithm
108 encrypted key
110 key extraction
112 session key
114 input data
116 AES algorithm
118 encrypted data
200 method for securing communicated data
202 new session key
300 illustrative implementation
302 AES function
304 key extraction function
306 multiplexer
308 multiplexer 310 multiplexer
400 illustrative implementation
500 gateway message transmission process
502 start gateway message transmission process
504 read plain data
506 check if counter greater than zero
508 read the initial key
510 read the session key
512 resulting key
514 encrypt message payload
516 compute message authentication code using hash function
520 store the message authentication code of the message
522 transmit the message to the air interface
524 check if transmission has finished
526 compute and store the session key for the gateway message receipt process
528 increase the counter
530 check if more messages should be transmitted
532 end gateway message transmission process
600 gateway message receipt process
602 start gateway message receipt process
604 receive encrypted message from the destination node
606 check if receipt has finished
608 read the stored session key
610 decrypt the message with the session key
612 store the decrypted data
614 check if more messages should be received
616 end gateway message receipt process

The invention claimed is:

1. A method for securing data communicated in a network, comprising:
  receiving, by a destination node in the network, at least one message transmitted by a source node in the network;
  generating, by said destination node, a session key by executing a one-way function that takes at least a part of a last received message and an initial key as input parameters;
  using, by said destination node, the session key for block encrypting or block decrypting said data.

2. A method as claimed in claim 1, wherein said part of the last received message is a message authentication code.

3. A method as claimed in claim 1, wherein the one-way function is an encryption function.

4. A method as claimed in claim 1, wherein the session key is also generated by the source node, and wherein the session key is used, by the source node and the destination node, to encrypt and decrypt data communicated between them.

5. A method as claimed in claim 1, wherein the source node is a network gateway.

6. A method as claimed in claim 1 wherein the initial key is a secret master key.

7. A method as claimed in claim 1 wherein the data are encrypted or decrypted by executing said one-way function.

8. A method as claimed 1 in claim 1, wherein generating the session key comprises performing a key extraction process after executing the one-way function.

9. A method as claimed in claim 1, further comprising:
  generating, by the destination node, a new session key by executing the one-way function, wherein the one-way function takes said part of the last received message and the session key as input parameters;
  using, by the destination node, the new session key for encrypting or decrypting said data.

10. A method as claimed in claim 9, wherein the new session key is also generated by the source node, and wherein the new session key is used, by the source node and the destination node, to encrypt and decrypt data communicated between them.

11. A computer program product comprising non-transient executable instructions being executed by a processing unit, causing said processing unit to carry out or control the steps of the method as claimed in claim 1.

12. A system for securing data communicated in a network, comprising:
  a destination node in the network, said destination node being arranged to receive messages from a source node in the network;
  said destination node further being arranged to generate a session key by executing a one-way function that takes at least a part of a last received message and an initial key as input parameters;
  said destination node further being arranged to use the session key for block encrypting or block decrypting said data.

13. A system as claimed in claim 12, wherein the source node is also arranged to generate the session key, and wherein the source node and the destination node are arranged to encrypt and decrypt data communicated between them using the session key.

14. A system as claimed in claim 12, wherein:
  the destination node is further arranged to generate a new session key by executing the one-way function, wherein the one-way function takes said part of the last received message and the session key as input parameters;
  the destination node is further arranged to use the new session key for encrypting or decrypting said data.

15. A system as claimed in claim 14, wherein the source node is also arranged to generate the new session key, and wherein the source node and the destination node are arranged to encrypt and decrypt data communicated between them using the new session key.

16. The device of claim 12,
  wherein the destination node device is configured to generate the session key by performing a key extraction process after executing the one-way function.

* * * * *